United States Patent [19]

Leiber

[11] 4,094,554
[45] June 13, 1978

[54] HYDRAULIC BRAKE BOOSTER FOR A VEHICULAR BRAKE SYSTEM

[75] Inventor: Heinz Leiber, Leimen, Germany

[73] Assignee: Robert Bosch GmbH, Stuttgart, Germany

[21] Appl. No.: 775,220

[22] Filed: Mar. 7, 1977

[30] Foreign Application Priority Data

Mar. 10, 1976 Germany ............................ 2609905

[51] Int. Cl.$^2$ .............................................. B60T 13/16
[52] U.S. Cl. ....................................... 303/52; 60/557; 303/10
[58] Field of Search .......................... 60/545, 555–558; 303/6 C, 910, 11, 52, 53, 84 A, 84 R

[56] References Cited

U.S. PATENT DOCUMENTS

| 3,677,002 | 7/1972 | Fulmer ............................... 60/545 X |
| 3,830,549 | 8/1974 | Kito et al. ........................... 303/52 X |
| 3,910,645 | 10/1975 | Takeuchi et al. ................... 303/10 X |
| 3,976,171 | 8/1976 | Belart ..................................... 303/52 |

*Primary Examiner*—Duane A. Reger
*Attorney, Agent, or Firm*—Edwin E. Greigg

[57] ABSTRACT

A master cylinder for a two-circuit brake system which includes an anti-skid control has two separate chambers and pistons. The main control piston is associated with a booster piston which it engages after a predetermined amount of travel. The brake pedal is arranged to actuate inlet and outlet valves and a selector piston provided with an array of longitudinally disposed rods is arranged to actuate the inlet valve.

4 Claims, 1 Drawing Figure

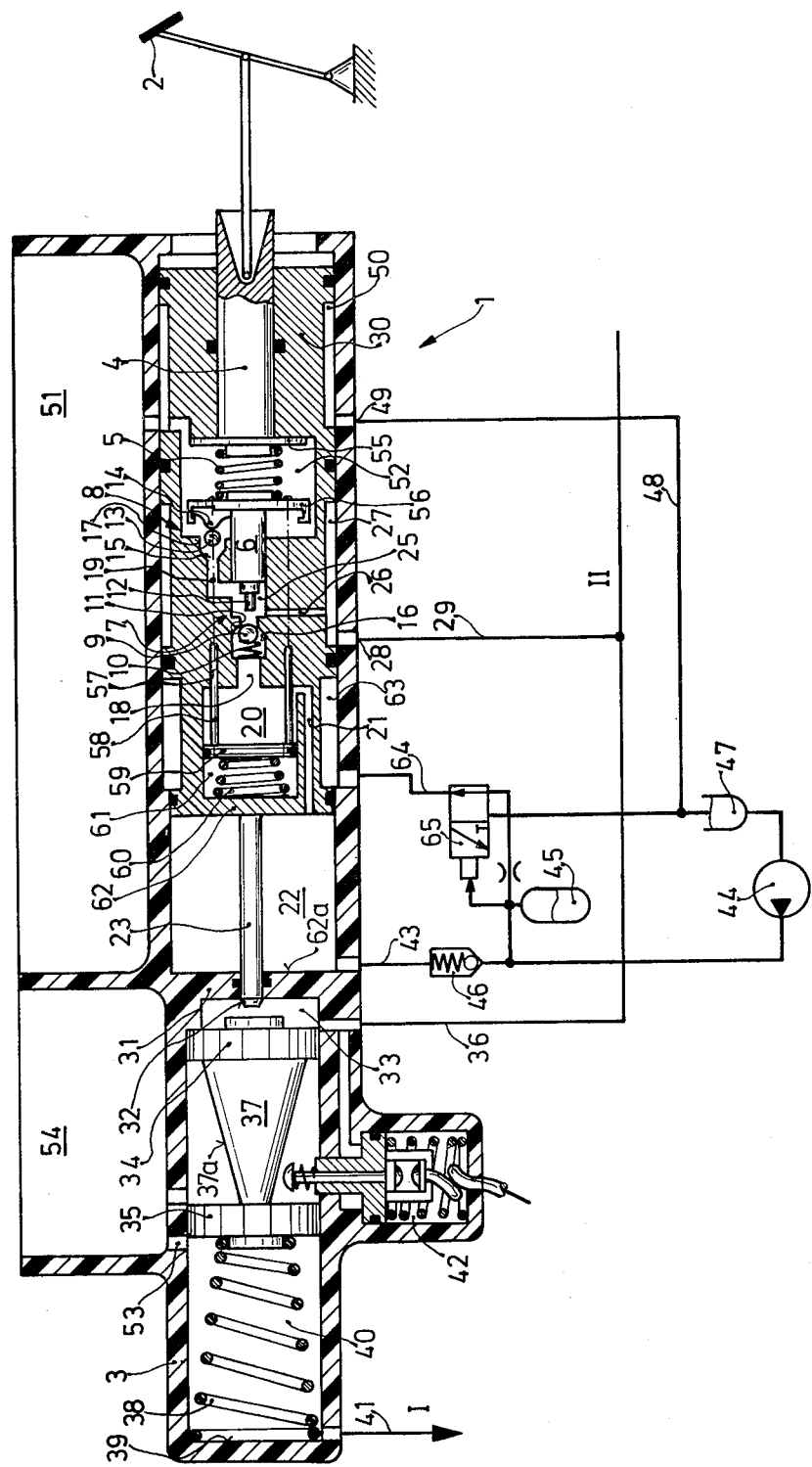

HYDRAULIC BRAKE BOOSTER FOR A VEHICULAR BRAKE SYSTEM

BACKGROUND OF THE INVENTION

The invention relates to a two circuit braking system for vehicles, and more particularly to a master brake cylinder for such a system. The master cylinder includes an auxiliary piston within which slides a control valve disposed between a source of brake pressure and a first braking circuit. The pressure within the first braking circuit reacts back onto the control piston and also onto the control surface of a piston functioning in the main cylinder intended for the second braking circuit. A master brake cylinder of this type is described in the German Offenlegungsschrift 2 312 641.

With brake boosters of this kind the problem exists that upon the loss of the reserve pressure the travel spring excursion then represents an unnecessary waste motion which elongates the pedal travel of the brake booster upon the loss of the auxiliary energy.

OBJECT AND SUMMARY OF THE INVENTION

Accordingly, it is the principal object of the present invention to avoid that disadvantage and to create a brake booster of the general kind cited above in which the loss of the reserve pressure influences the travel spring.

This objective is achieved, according to the invention, by incorporating a selector piston in the stepped booster piston, which selector piston is exposed on one side to the pressure of a spring and on the other side to the pressure from the storage source. Further, in this construction, the selector piston can act upon a spring dish arranged adjacent to the travel spring by means of a selector piston provided with a plurality of rods, the arrangement being such that the travel spring can be disabled by means of the selector piston upon the loss of the pressure from the storage source.

Other objects and advantages of the present invention will be more readily apparent from a further consideration of the following detailed description of the drawing illustrating a preferred embodiment of the invention, in which:

BRIEF DESCRIPTION OF THE DRAWING

The single FIGURE is a cross-sectional view of the brake booster of the invention described herein.

DESCRIPTION OF THE PREFERRED EMBODIMENT

Turning now to the drawing, it will be observed that a hydraulic brake booster 1 is disposed between a brake pedal 2 and a hydraulic dual-circuit main cylinder 3 of tandem construction. The brake booster 1 has a control piston 4 which acts via a longitudinally disposed travel spring 5 upon a stub shaft 12 extending from a push rod 6 of double valves 7 and 8. The one valve 7 of the double valve assembly is an inlet valve. This inlet valve is located coaxially relative to the control piston 4 and includes a spherical closure body 9 which ordinarily rests on its valve seat 11 under the force of a spring 10 and which can be lifted off its seat 11 by means of the push rod extension 12 that is carried by the stub shaft 6 that is in turn axially aligned with the control piston 4 and spaced therefrom by the spring 5. The other valve 8 functions as an outlet valve of the brake booster 1 and, as shown, is offset from the center and located parallel to the axis of the booster. A closure body 13 likewise constructed as a ball or sphere is carried by a projection 14 on the stub shaft of the push rod 6 and is intended to cooperate with a valve seat 15.

The two valve seats 11 and 15 are constructed as enlarged bores 16 and 17 of the ducts 18 and 19 that are provided within a booster piston 30. The duct 18 leads via a pressure-medium working chamber 20 and via a longitudinal communicating duct 21 of the booster piston 30 into a pressure chamber 22 which contains a push rod 23 carried by the booster piston 30 and axially aligned with the control piston 4. The other duct 19 communicates with a chamber 25 that surrounds the push rod extension 12 and a radial duct 26 extends from the chamber 25 and leads to a cylindrical recess 27 arranged in the booster piston 30. The recess 27 is arranged to communicate at all times with a port 28 that is connected via a line 29 with the brake circuit II.

The pressure chamber 22 of the brake booster 1 is arranged in spaced relation relative to the hydraulic main cylinder 3 by an axially perforated wall 31 which includes an appropriate sealing means that is penetrated by the free terminal end 32 of the push rod 23. The free terminal end 32 of push rod 23 thus extends into a primary pressure chamber 33 in which is reciprocably positioned double pistons 34 and 35 that are held in spaced relation by a frustum 37. The pressure chamber 33 is likewise connected via a line 36 with the brake circuit II.

The frustum that is disposed between the two pistons 34 and 35 thus has a sloping wall 37a which converges toward the secondary piston 35. A return spring 38 is disposed in chamber 40 and includes one end that is adapted to thrust against the base 39 of the main cylinder 3 while the other end thereof abuts against the piston 35. Accordingly, the chamber 40 that is located between the base 39 and the piston 35 provides the secondary pressure chamber of the main cylinder 3 and a line 41 that is connected with the brake circuit I communicates with the chamber 40 adjacent to the wall 39. A mechanical or else purely pressure dependently actuatable electrical warning device 42, which responds upon a malfunction during the pressure rise in the two brake circuits I and II, is attached to the main cylinder 3.

The pressure chamber 22 is connected via a line 43 to the pressure side of a pump 44 and to a pressure reservoir 45 which serves as the storage source. A check valve 46 opening toward the pressure chamber 22 is inserted into line 43 to prevent backflow. The suction side of the pump 44 is joined to a reservoir 47 that is connected via a line 48 to a junction 49 of the brake booster 1. The junction 49 communicates at all times with a cylindrical recess 50 provided in the booster piston 30 and in turn the recess 50 communicates at all times with both a refill container 51 as well as with a relief chamber 52 of the booster piston 30, which contains the spring 5. A refill container 54 also communicates with the chamber 40 via a vent hole 53 when the brake has been released.

One side of the travel spring 5 presses against a plate 55 that is attached to the inner end of the control piston 4 and the other side of the spring abuts against a spring dish 56 which provides a stop means carried by the stub shaft of push rod 6. Three longitudinal borings 57 oriented parallel to the axis of the booster piston 30 are distributed in a circular pattern around the control valves 7 and 8, and rods 58 associated with piston 59 are inserted into the borings 57. It will be noted from the drawing that the diameter of the circular pattern of which the rods 58 are comprised is smaller than the overall diameter of the spring dish 56.

These three rods 58 thus comprise the piston rod of a selector piston 59 that is incorporated into the booster piston 30 and thereby provide the means to separate the pressure-medium chamber 20 from a chamber 61 that contains a spring 60. The pressure-medium working chamber 20 communicates with the pressure chamber 22 via a longitudinal duct 21 that is arranged in the booster piston 30.

The booster piston 30 is constructed as a stepped piston and the pressure chamber 22 is confined between the front of the smaller piston 62 and the wall 62a. An annular chamber 63 provided in the stepped booster piston 30 is linked via a line 64 to a 2/3 -way valve 65, which connects this annular chamber 63 reserve-pressure dependently either with the pressure reservoir 45, as shown in the drawing, or else with the reservoir 47.

OPERATION

The improved brake booster described hereinbefore functions in the following manner:

The movable parts of the brake booster when the brake has been released then assume the positions shown in the drawing.

When, during braking, the pedal 2 is actuated by means of the push rod 6, then outlet valve 8 is first closed, i.e., after the traversal of the gap bridged by the travel spring 5. The closure of the outlet valve 8 interrupts the connection of the brake circuit II with the refill container 51 and with the reservoir 47.

During a continued longitudinal movement of the pedal 2 the extension 12 provided on the push rod 6 pushes the spherical inlet valve 9 open. At this time pump pressure from the pressure chamber 22 can now propagate into the line 29 and to the brake circuit II. However, it is to be noted that this pressure also acts in the primary pressure chamber 33 via the line 36. The double pistons 34 and 35 are displaced to the left (as shown in the drawing) against the force of the spring 38. After the piston 35 travels past the vent hole 53, the pressurized fluid in the chamber 40 is then allowed to flow into the brake circuit I via the line 41. The pressure in the brake circuit I thus corresponds to the pressure in the brake circuit II. The pressure in the brake circuit II also acts upon the warning device 42, which informs the driver of a malfunction during pressure differences between the two brake circuits.

The magnitude of the reserve pressure is ordinarily 120 to 230 atmospheres. This pressure also acts in the pressure-medium working chamber 20 and this assures that the selector piston 59 will keep the spring 60 in the spring chamber 61 in the compressed state. The travel spring 5 of the brake booster is thereby left unimpeded and fully effective, so long as the reserve pressure is maintained. However, if the reserve pressure falls below a magnitude of 80 atmospheres or is lost entirely, then the force of the spring 60 at the selector piston 59 predominates and the selector piston 59 moves to the right (as shown in the drawing), thus pushing against the spring dish 56 with its tripartite piston rod 58 and compressing the travel spring 5 thereby disabling travel spring 5. When the brake pedal 2 is now actuated during this compressed and disabled state of the travel spring 5, the booster piston immediately transmits the pedal force mechanically, without operating the control valves 7 and 8 and the waste motion otherwise imparted by the travel spring 5 is thereby avoided.

What is claimed is:

1. In a master brake cylinder for two-circuit braking systems including a housing, a control piston sliding within an booster piston, a brake control valve, actuated by said control piston, for establishing fluid communication between said master cylinder and the first and second of said two brake cylinders, said control piston having means for engaging and carrying along said booster piston after a predetermined amount of axial travel, and including a second main cylinder and piston for said second braking circuit, the improvement comprising:

said booster piston having oppositely disposed surfaces, one of which is subjected to pressure from a resilient means and the other of said surfaces being subjected to pressure flow from a pump and means associated with said booster piston serving to cooperate with a stop means and further arranged to sense loss of pressure flow.

2. The apparatus as defined by claim 1, in which the other of said surfaces of said booster piston provides one surface area of a first chamber that communicates with said brake control valve.

3. The apparatus as defined by claim 2 in which said first chamber is arranged to communicate with another chamber provided by a wall of said control piston.

4. The apparatus as defined by claim 1, in which said means that cooperate with said stop means comprise an array of rod means associated with said booster piston.

* * * * *